United States Patent
Son et al.

(10) Patent No.: US 9,706,477 B2
(45) Date of Patent: Jul. 11, 2017

(54) METHOD AND DEVICE FOR CONFIGURING MULTI-BAND BASED LINK IN WIRELESS LAN SYSTEM

(71) Applicant: INTELLECTUAL DISCOVERY CO., LTD., Seoul (KR)

(72) Inventors: Ju Hyung Son, Uiwang-si (KR); Jin Sam Kwak, Uiwang-si (KR)

(73) Assignee: Intellectual Discovery Co., LTD., Seoul (KR)

( * ) Notice: Subject to any disclaimer, the term of this patent is extended or adjusted under 35 U.S.C. 154(b) by 0 days.

(21) Appl. No.: 14/777,372

(22) PCT Filed: Mar. 13, 2014

(86) PCT No.: PCT/KR2014/002102
§ 371 (c)(1),
(2) Date: Sep. 15, 2015

(87) PCT Pub. No.: WO2014/142569
PCT Pub. Date: Sep. 18, 2014

(65) Prior Publication Data
US 2016/0050614 A1     Feb. 18, 2016

(30) Foreign Application Priority Data

Mar. 15, 2013  (KR) .......................... 10-2013-0028310
Apr. 30, 2013  (KR) .......................... 10-2013-0048936
(Continued)

(51) Int. Cl.
*H04W 4/00*       (2009.01)
*H04W 48/08*   (2009.01)
(Continued)

(52) U.S. Cl.
CPC ........... *H04W 48/08* (2013.01); *H04L 5/0092* (2013.01); *H04L 43/12* (2013.01); *H04L 47/12* (2013.01);
(Continued)

(58) Field of Classification Search
CPC ..... H04W 48/08; H04W 12/06; H04W 24/02; H04W 48/12; H04W 48/14; H04W 48/16;
(Continued)

(56) References Cited

U.S. PATENT DOCUMENTS

2007/0104128 A1   5/2007  Laroia et al.
2007/0230423 A1*  10/2007 Yoshida ................ H04W 76/02
                                                                      370/338
(Continued)

FOREIGN PATENT DOCUMENTS

KR  10-2009-0051247 A   5/2009
KR  10-2010-0052421 A   5/2010
(Continued)

OTHER PUBLICATIONS

International Search Report and Written Opinion issued on Mar. 13, 2014 in counterpart International Application No. PCT/KR2014/002102 (11 pages).

*Primary Examiner* — Keith Fang (57) ABSTRACT

A method and a device for setting a multi-band based link in a wireless LAN system are disclosed. The method for configuring a wireless link comprises the steps of: receiving, from a wireless access device supporting the plurality of communication channels, a beacon message through a first communication channel among a plurality of communication channels; obtaining, from the beacon message, wireless access information which is used for accessing a first communication channel; and obtaining, from the beacon message, at least one available communication channel list
(Continued)

except for the first communication channel among the plurality of communication channels. Thus, the time for configuring a link between wireless LAN apparatuses can be reduced.

8 Claims, 10 Drawing Sheets

(30) Foreign Application Priority Data

| Apr. 30, 2013 | (KR) | ................. 10-2013-0048938 |
| Apr. 30, 2013 | (KR) | ................. 10-2013-0048940 |
| Apr. 30, 2013 | (KR) | ................. 10-2013-0048944 |

(51) Int. Cl.
| H04W 48/16 | (2009.01) |
| H04L 5/00 | (2006.01) |
| H04W 24/02 | (2009.01) |
| H04W 72/04 | (2009.01) |
| H04L 12/26 | (2006.01) |
| H04L 12/801 | (2013.01) |
| H04W 48/12 | (2009.01) |
| H04W 84/12 | (2009.01) |
| H04W 12/06 | (2009.01) |
| H04W 88/08 | (2009.01) |

(52) U.S. Cl.
CPC ........... *H04W 24/02* (2013.01); *H04W 48/12* (2013.01); *H04W 48/16* (2013.01); *H04W 72/042* (2013.01); *H04W 12/06* (2013.01); *H04W 84/12* (2013.01); *H04W 88/08* (2013.01)

(58) Field of Classification Search
CPC .. H04W 72/042; H04W 88/08; H04L 5/0092; H04L 43/12; H04L 47/12
See application file for complete search history.

(56) References Cited

U.S. PATENT DOCUMENTS

| 2010/0016023 | A1 | 1/2010 | Yamauchi et al. |
| 2010/0118851 | A1 | 5/2010 | Kim et al. |
| 2010/0177756 | A1* | 7/2010 | Choi .................. H04W 72/042 370/338 |
| 2013/0176960 | A1* | 7/2013 | Franklin ............. H04W 72/046 370/329 |

FOREIGN PATENT DOCUMENTS

| KR | 10-2010-0065391 A | 6/2010 |
| KR | 10-2010-0083703 A | 7/2010 |

* cited by examiner

METHOD AND DEVICE FOR CONFIGURING MULTI-BAND BASED LINK IN WIRELESS LAN SYSTEM

TECHNICAL FIELD

A variety of example embodiments according to the present invention generally relate to configuration of a wireless link, and more specifically to methods and devices for rapidly configuring an initial link in a wireless local area networking (WLAN) system.

BACKGROUND ART

Currently, according to wide distribution of mobile stations, a wireless local area networking (WLAN) technology which can provide faster wireless internet services to the mobile stations is becoming remarkable. The WLAN technology is a technology which can make mobile stations such as smart phones, smart pads, laptop computers, portable multimedia players, embedded devices, etc. able to wirelessly access an internet in home, company, or specific service provision areas, based on wireless communication technologies.

DISCLOSURE

Technical Problem

The present invention is to provide methods for configuring links between WLAN devices supporting operations in multiple frequency bands.

Also, the present invention is to provide apparatuses for configuring links between WLAN devices supporting operations in multiple frequency bands.

Technical Solution

In order to achieve the purposes of the present invention, according to an example embodiment according to the present invention, a method may be provided for configuring a wireless link, and performed in a mobile station. The method may comprise receiving a beacon message from a wireless access station supporting a plurality of communication channels through a first communication channel among the plurality of communication channels; obtaining wireless access information used for accessing the first communication channel from the beacon message; and obtaining a list of at least one available communication channel excluding the first communication channel among the plurality of communication channels from the beacon message.

Here, the method may further comprise determining a communication channel for access among the first communication channel and the at least one available communication channel; and trying to access the wireless access station by using the determined communication channel.

Here, in the trying to access, when the determined communication channel is the first communication channel, authentication may be requested through the first communication channel by using the wireless access information.

Here, the trying to access may further comprise, when the determined communication channel is one of the at least one available communication channel, transmitting a probe request message through the determined communication channel; and receiving a probe response message in response to the probe request message from the wireless access station.

In order to achieve the purposes of the present invention, according to another example embodiment according to the present invention, a method may be provided for configuring a wireless link, and performed in a wireless access station supporting a plurality of communication channels. The method may comprise generating a beacon message including wireless access information used for accessing through a first communication channel among the plurality of communication channels and a list of at least one available communication channel excluding the first communication channels among the plurality of communication channels; and transmitting the beacon message through the first communication channel.

Here, the method may further comprise, when an authentication request is received form a mobile station through the first communication channel, performing an authentication procedure with the mobile station.

Here, the method may further comprise, when a probe request message is received from a mobile station through the at least one available communication channel, transmitting a probe response message to the mobile station in response to the probe request message.

In order to achieve the another purposes of the present invention, according to an example embodiment according to the present invention, a mobile station may comprise a control part controlling operations of the mobile station; and at least one network interface card for transmitting and receiving data based on commands of the control part, wherein the control part receives a beacon message from a wireless access station supporting a plurality of communication channels through a first communication channel among the plurality of communication channels, obtains wireless access information used for accessing the first communication channel from the beacon message, and obtains a list of at least one available communication channel excluding the first communication channel among the plurality of communication channels from the beacon message.

Here, the control part may determine a communication channel for access among the first communication channel and the at least one available communication channel, and try to access the wireless access station by using the determined communication channel.

Here, when the determined communication channel is the first communication channel, the control part may request authentication through the first communication channel by using the wireless access information.

Here, when the determined communication channel is one of the at least one available communication channel, the control part may transmit a probe request message through the determined communication channel, and receive a probe response message from the wireless access station in response to the probe request message.

In order to achieve the another purposes of the present invention, according to another example embodiment according to the present invention, a wireless access station may comprise a control part controlling operations of the wireless access station; and at least one network interface card for transmitting and receiving data based on commands of the control part, wherein the control part generates a beacon message including wireless access information used for accessing through a first communication channel among the plurality of communication channels and a list of at least one available communication channel excluding the first communication channels among the plurality of communication channels, and transmits the beacon message through the first communication channel.

Here, when an authentication request is received form a mobile station through the first communication channel, the control part may perform an authentication procedure with the mobile station.

Here, when a probe request message is received from a mobile station through the at least one available communication channel, the control part may transmit a probe response message to the mobile station in response to the probe request message.

Advantageous Effects

According to example embodiments of the present invention, it becomes possible to reduce a time required for configuring links between WLAN devices supporting operations in multiple frequency bands. Especially, according to example embodiments of the present invention, since communication channel information can be rapidly obtained when links are being configured with a wireless access point using one or more communication channels, the time required for configuring an initial link can be reduced even when a channel through which a mobile station receives a beacon and a channel which the mobile station tries to access is different.

MODE FOR INVENTION

Since embodiments described in the present specification are intended to clearly describe the spirit of the present invention to those skilled in the art to which the present invention pertains, the present invention is not limited to those embodiments described in the present specification, and it should be understood that the scope of the present invention includes changes or modifications without departing from the spirit of the invention.

The terms and attached drawings used in the present specification are intended to easily describe the present invention and shapes shown in the drawings are exaggerated to help the understanding of the present invention if necessary, and thus the present invention is not limited by the terms used in the present specification and the attached drawings.

In the present specification, detailed descriptions of known configurations or functions related to the present invention which have been deemed to make the gist of the present invention unnecessarily obscure will be omitted below.

Hereinafter, a method and a device for fast accesses between WLAN devices using a plurality of communication channels according to embodiments of the present invention will be described.

Among standards of WLAN technologies, standardization on Medium Access Control (MAC) and Physical (PHY) layers are going on in an Institute of Electrical and Electronics Engineers (IEEE) 802.11 working group.

Figure 1:
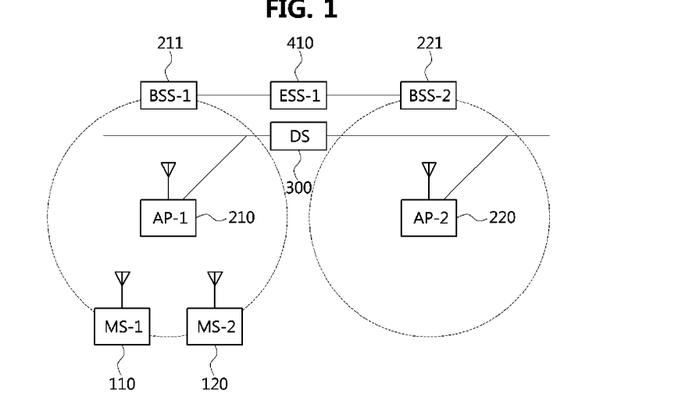
FIG. 1 conceptually illustrates an example configuration of a WLAN system to which embodiments of the present invention can be applied.

FIG. 1 conceptually illustrates an example configuration of a WLAN system to which embodiments of the present invention can be applied.

Referring to FIG. 1, the WLAN system may include one or more basic service sets (BSS) 211 and 221. The BSS 211 or 221 is a set of stations which can communicate with each other, and managed by an access point (AP) 210 or 220. A mobile station (MS) 110 or 120 may perform a role of providing wireless internet services to a user by accessing the AP 210 or 220 according to IEEE 802.11 WLAN standards.

The BSS 211 or 221 may be classified into an infrastructure BSS and an independent BSS, and the infrastructure BSS is illustrated in FIG. 1. The BSS-1 211 is managed and operated by the AP-1 210, and one or more MSs including MS-1 110 and MS-2 120 may receive WLAN services through the AP-1 210. Also, the AP-1 210 is connected to the AP-2 220 through a distribution system (DS) 300. The BSSs 211 and 221 connected through the DS 300 may form an extended service set (ESS) 410. Since the detail of configurations of WLAN systems is described in the standard specifications such as IEEE 802.11-2012 (Mar. 29, 202), explanation on the detail will be omitted herein. The contents of the standard specifications may be combined to the present description for reference.

Figure 2:
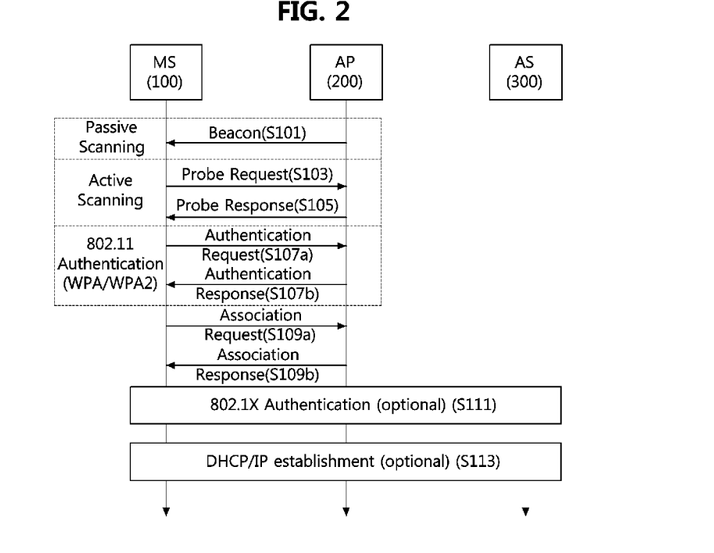
FIG. 2 conceptually illustrate a step in which MS configures a link with AP according to an example embodiment of the present invention.

FIG. 2 conceptually illustrate a step in which MS configures a link with AP according to an example embodiment of the present invention.

Referring to FIG. 2, a procedure for MS 100 to access AP 200 may comprise three steps—scanning, authentication, and association. The scanning step is a step in which the MS 100 obtains access information of a BSS operated by the AP 200. For the scanning, there are a passive scanning technique S101 that obtains information by using beacon messages which are periodically transmitted by the AP, and an active scanning technique in which the MS transmits a probe request to the AP (S103), receives a probe response from the AP (S105), and obtains access information from the probe response.

The MS 100 which successfully receives the wireless access information in the scanning step may perform the authentication step by transmitting an authentication request (S107a) and receiving an authentication response (S107b). After successful completion of the authentication step in the IEEE 802.11 layer, the association step (S109a and S109b) may be performed. In addition, authentication based on 802.1X (S111) and a step of obtaining IP address through DHCP (S113) may be performed.

Figure 3:
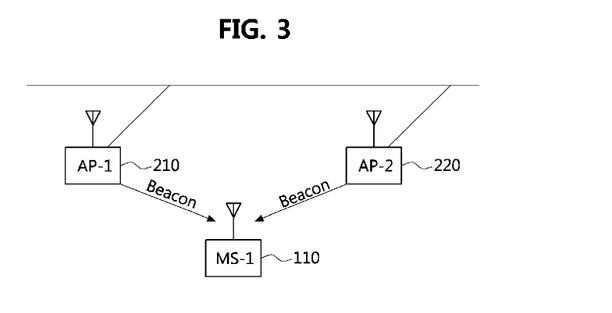
FIG. 3 illustrates a passive scanning step of MS related to an example embodiment of the present invention.

FIG. 3 illustrates a passive scanning step of MS related to an example embodiment of the present invention.

Referring to FIG. 3, the MS-1 110 according to the present invention may obtain wireless access information or respective APs by receiving beacon message which are periodically transmitted by AP-1 210 and AP-2 220 located adjacently.

Figure 4:
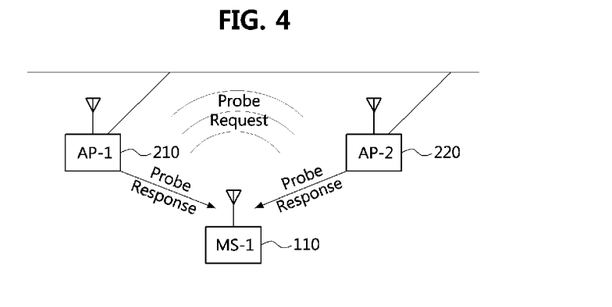
FIG. 4 illustrates an active scanning step of MS related to an example embodiment of the present invention.

FIG. 4 illustrates an active scanning step of MS related to an example embodiment of the present invention.

Referring to FIG. 4, the MS-1 110 according to the present invention may transmits a probe request message to obtain information of APs located adjacently, and obtain wireless access information of respective APs by receiving the corresponding probe response messages from AP-1 210 and AP-2 220.

Figure 5:
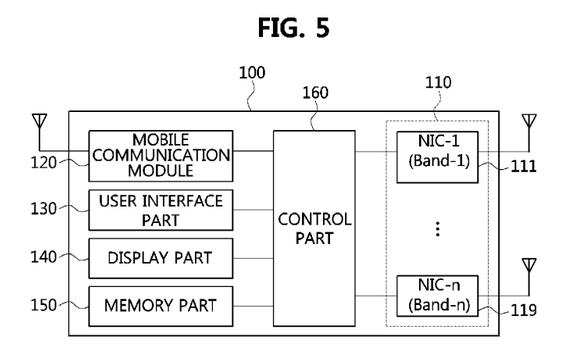
FIG. 5 is a block diagram which conceptually illustrates a mobile station (MS) 100 related to an example embodiment of the present invention.

FIG. 5 is a block diagram which conceptually illustrates a mobile station (MS) 100 related to an example embodiment of the present invention.

Referring to FIG. 5, the MS 100 according to the present invention may comprise at least one network interface cards (NIC) 111 to 119 performing a WLAN access through an AP. The network interface cards 111 to 119, modules for performing WLAN access, may be embedded within the MS or installed in outside of the MS. The network interface cards 111 to 119 may perform wireless communications with the AP according to respective supported WLAN specifications. Also, among the network interface cards 111 to 119, only one NIC may operate at a time or a plurality of NICs may simultaneously operate according to performance of the MS 100 or system requirements. In the MS 100 of FIG. 5, the multiple NICs 111 to 119 are illustrated as separated, and MAC and PHY layers of each NIC may operate independently from each other. These NICs 111 to 119 may be implemented as a functional entity which can be separated physically or as a single integrated physical entity.

A mobile communication module 120 may make the MS 100 transmit and receive wireless signals to/from an external device in a mobile communication network. A user interface part 130 may make commands for controlling the MS 100 be input by a user.

A display part 140 may display results from operations of the MS 100, status of the MS 100, and information provided by the AP.

A memory part 150 may store access program codes for controlling access to the AP, and various data for the program codes.

A control part 160 may perform a role of controlling each of the NICs 111 to 119 to make the MS 100 try to access the AP through an appropriate frequency band by using access information provided by the AP and user/system requirements.

Figure 6:
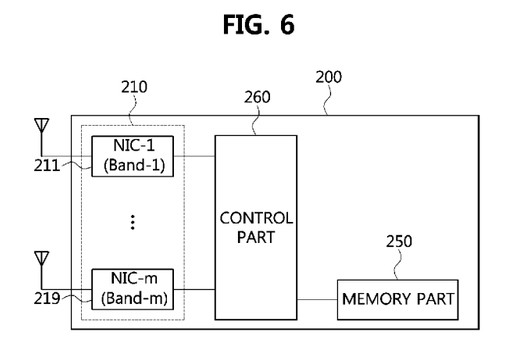
FIG. 6 is a block diagram which conceptually illustrates an access point 200 related to an example embodiment of the present invention.

FIG. 6 is a block diagram which conceptually illustrates an access point 200 related to an example embodiment of the present invention.

Referring to FIG. 6, the AP 200 according to the present invention may comprise at least one network interface cards (NIC) 211 to 219 for operating BSS in one or more frequency bands. The network interface cards 211 to 219, modules for performing WLAN access, may be embedded within the AP 200 or installed in outside of the AP 200. The NICs 211 to 219 may perform wireless communications with the MS according to respective supported WLAN specifications. Also, among the network interface cards 211 to 219, only one NIC may operate at a time or a plurality of NICs may simultaneously operate according to performance of the AP 200 or system requirements. In the AP 200 of FIG. 6, a plurality of NICs 211 to 219 are illustrated as separated, and MAC and PHY layers of each NIC may operate independently from each other. These NICs 211 to 219 may be implemented as a functional entity which can be separated physically or as a single integrated physical entity.

A memory part 250 may store access program codes for controlling access from mobile stations, and various data for the program codes.

A control part 260 may perform a role of controlling each of the NICs 211 to 219 to make the AP 200 process access from MS through an appropriate frequency band by using access information for multiple frequency bands and user/system requirements.

Figure 7:
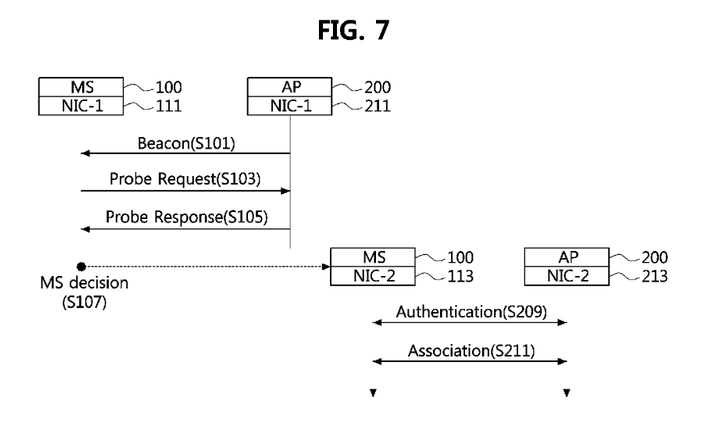
FIG. 7 is a flow chart illustrating, as an example embodiment of the present invention, a WLAN access procedure in which MS 100 uses only one NIC at a time when MS 100 has multiple NICs 111 and 113.

FIG. 7 is a flow chart illustrating, as an example embodiment of the present invention, a WLAN access procedure in which MS 100 uses only one NIC at a time when MS 100 has multiple NICs 111 and 113.

Referring to FIG. 7, the MS 100 may try a WLAN access. First, the AP 200 may periodically transmit individual beacon messages to MSs existing in service regions of all BSSs operated by it, in broadcast manner (S101). In this example embodiment, it is assumed that the AP 200 transmits a beacon in BSS-1 operated by NIC-1 211 (S101).

Figure 8:
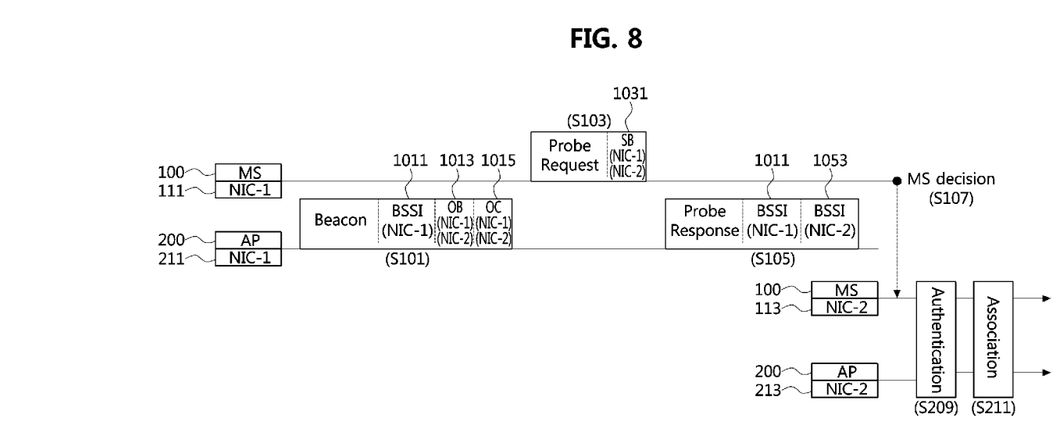
FIG. 8 illustrates the example embodiment of FIG. 7 in detail as representing details of messages.

In this example embodiment, the MS 100 receives the beacon from NIC-1 111 as including BSS information (BSSI, i.e., access information) denoted as 1011 of FIG. 8, operating band (OB) information denoted as 1013 of FIG. 8, and operating channel (OC) information denoted as 1015 of FIG. 8. The BSSI 1011 includes access information of BSS-1. The OB information 1013 includes frequency band ID information of frequency bands operated by the AP 200 through NIC-1 211 and NIC-2 213. Also, the OC information 1015 includes detailed channel ID number information of frequency bands operated by the AP 200 through NIC-1 211 and NIC-2 213.

The MS 100 receiving the beacon may immediately try to access BSS-1 operated by NIC-1 211 of the AP 200 by using BSSI 1011. However, in case that the MS 100 tries to access BSS-2 operated by NIC-2 213 of the AP 200 other than BSS-1, it may be impossible to access it by using only information of the beacon. In this case, for requesting additional information, the MS 200 may transmit a probe request message to the AP 200 for requesting BSSI of NIC-2 213 in a broadcast manner (S103). (In addition, the MS which does not receive a beacon may transmit a probe request message in broadcast manner in order to request detailed BSSI to the AP.)

The probe request may be transmitted as including supporting band (SB) information (1031 of FIG. 8) which comprises information on one or more frequency bands which can be accessed by one or more NICs of the MS 100.

The AP 200 receiving the probe request message may transmit a probe response message to the MS 100 in response to the probe request message, in unicast manner (S105). The probe response message may include BSSI (denoted as 1011 of FIG. 8) needed for the MS 100 to access via NIC-1 111 and BSSI (denoted as 1053 of FIG. 8) needed for the MS 100 to access via NIC-2 113.

When the MS obtains BSSI 1011 and BSSI 1053 by receiving the probe response message S105, the MS 100 may try to access the AP by selecting a preconfigured band or a preferred band, or by simultaneously using multiple NICs 111 and 113. This step may be referred to as a MS decision step S107. In addition, the probe response message S105 may include load/availability indicators in respective BSSIs, considering degrees of traffic congestion and load of the AP in respective frequency bands. The MS 100 may utilize the above information to determine which NIC the AP 200 uses to access the AP.

Then, an authentication step S209 for link configuration and an association step S211 for exchanging association information may be performed with NICs 211 and 213 of the AP 200. In the example embodiment of FIG. 7, it is illustrated as assumption that access is requested only through NIC-2 213.

FIG. 8 illustrates the example embodiment of FIG. 7 in detail as representing details of messages.

Figure 9:
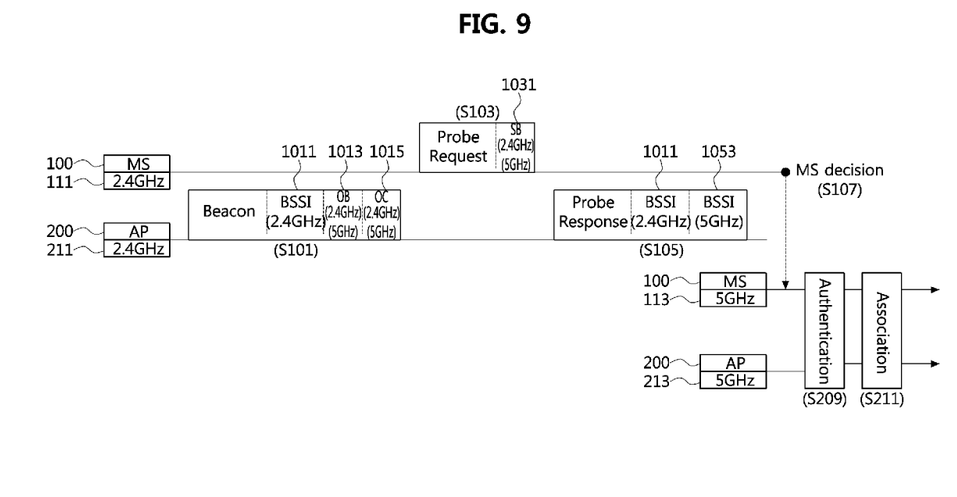
FIG. 9 illustrates operating example based on 2.4 GHz and 5 GHz bands for the example embodiment of FIG. 7.

FIG. 9 illustrates operating example based on 2.4 GHz and 5 GHz bands for the example embodiment of FIG. 7.

IEEE 802.11n WLAN may be used for multiple frequency bands, and it may typically operate in 2.4 GHz band and 5 GHz band. Meanwhile, although both a passive scanning and an active scanning can be used for 2.4 GHz band, only a passive scanning technique can be used for 5 GHz band according to frequency regulation. However, in case of the passive scanning in 5 GHz band, since a time is required for sequentially receiving beacon messages through multiple channels, it consumes long time for the MS to obtain AP access information.

Referring to FIG. 9 and considering the above restrictions, the present invention provides an effect that fast access in 5 GHz band becomes possible without performing passive scanning in 5 GHz band by using BSSI of 5 GHz band obtained through active scanning in 2.4 GHz band.

Referring to FIG. 9, the MS 100 tries to access WLAN. First, the AP 200 may periodically transmit individual beacon messages to MSs existing in service regions of all BSSs operated by it, in broadcast manner (S101). In this example embodiment, it is assumed that the AP 200 transmits a beacon in BSS-1 operated by 2.4 GHz NIC-1 211 (S101).

In this example embodiment, the MS 100 receives the beacon from 2.4 GHz NIC-1 111 as including BSS information (BSSI, i.e., access information) 1011, operating band (OB) information 1013, and operating channel (OC) information 1015. The BSSI 1011 includes access information of BSS-1. The OB information 1013 includes frequency band ID information of frequency bands operated by the AP 200 through 2.4 GHz NIC-1 211 and 5 GHz NIC-2 213. Also, the OC information 1015 includes detailed channel ID number information of frequency bands operated by the AP 200 through 2.4 GHz NIC-1 211 and 5 GHz NIC-2 213.

The MS 100 receiving the beacon may immediately try to access BSS-1 operated by 2.4 GHz NIC-1 211 of the AP 200 by using BSSI 1011. However, in case that the MS 100 tries to access BSS-2 operated by 5 GHz NIC-2 213 of the AP 200 other than BSS-1, it may be impossible to access it by using only information of the beacon S101. In this case, for requesting additional information, the MS 200 may transmit a probe request message to the AP 200 for requesting BSSI of 5 GHz NIC-2 213 in a broadcast manner (S103). (In addition, the MS which does not receive a beacon may transmit a probe request message in broadcast manner in order to request detailed BSSI to the AP.)

The probe request S103 may be transmitted as including supporting band (SB) information 1031 which comprises information on one or more frequency bands which can be accessed by one or more NICs 111 and 113 of the MS 100.

The AP 200 receiving the probe request message S103 may transmit a probe response message to the MS 100 in response to the probe request message, in unicast manner (S105). The probe response message may include BSSI 1011 needed for the MS 100 to access via 2.4 GHz NIC-1 111 and BSSI 1053 needed for the MS 100 to access via 5 GHz NIC-2 113, similarly to the beacon message S101.

When the MS obtains 2.4 GHz BSSI 1011 and 5 GHz BSSI 1053 by receiving the probe response message S105, the MS 100 may try to access the AP by selecting a band preconfigured by a user or a band preferred by the MS, or by simultaneously using multiple NICs 111 and 113. This step may be referred to as the MS decision step S107. In addition, the probe response message S105 may include load/availability indicators in respective BSSIs, considering degrees of traffic congestion and load of the AP in respective frequency bands. The MS 100 may utilize the above information to determine which NIC the AP 200 uses to access the AP.

Then, the authentication step S209 for link configuration and the association step S211 for exchanging association information may be performed with NICs 211 and 213 of the AP 200. In the example embodiment of FIG. 9, it is illustrated as assumption that access is requested only through 5 GHz NIC-2 213.

Figure 10:
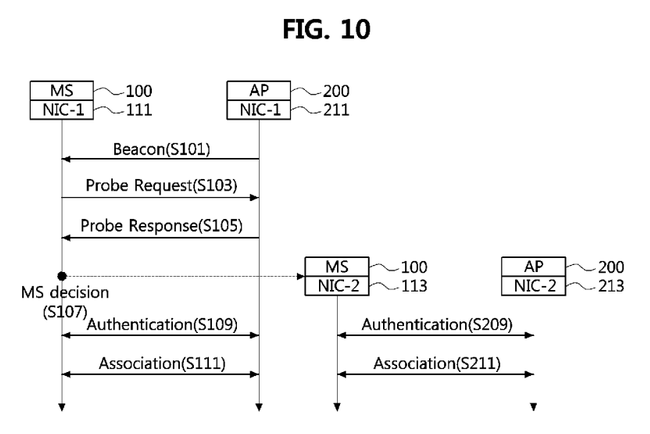
FIG. 10 is a flow chart illustrating, as an example embodiment of the present invention, a WLAN access procedure in which MS simultaneously uses multiple NICs when the MS has multiple NICs.

FIG. 10 is a flow chart illustrating, as an example embodiment of the present invention, a WLAN access procedure in which MS simultaneously uses multiple NICs when the MS has multiple NICs.

Referring to FIG. 10, the MS 100 may try a WLAN access. First, the AP 200 may periodically transmit individual beacon messages to MSs existing in service regions of all BSSs operated by it, in broadcast manner (S101). In this example embodiment, it is assumed that the AP 200 transmits a beacon in BSS-1 operated by NIC-1 211 (S101).

In this example embodiment, the MS 100 receives the beacon from NIC-1 111 as including BSSI 1011, OB information 1013, and OC information 1015. The BSSI 1011 includes access information of BSS-1. The OB information 1013 includes frequency band ID information of frequency bands operated by the AP 200 through NIC-1 211 and NIC-2 213. Also, the OC information 1015 includes detailed channel ID number information of frequency bands operated by the AP 200 through NIC-1 211 and NIC-2 213.

The MS 100 receiving the beacon may immediately try to access BSS-1 operated by NIC-1 211 of the AP 200 by using BSSI 1011. However, in case that the MS 100 tries to access BSS-2 operated by NIC-2 213 of the AP 200 other than BSS-1, it may be impossible to access it by using only information of the beacon. In this case, for requesting additional information, the MS 200 may transmit a probe request message to the AP 200 for requesting BSSI of NIC-2 213 in a broadcast manner (S103). (In addition, the MS which does not receive a beacon may transmit a probe request message in broadcast manner in order to request detailed BSSI to the AP.)

The probe request S103 may be transmitted as including supporting band (SB) information 1031 which comprises information on one or more frequency bands which can be accessed by one or more NICs 111 and 113 of the MS 100.

The AP 200 receiving the probe request message S103 may transmit a probe response message to the MS 100 in response to the probe request message, in unicast manner (S105). The probe response message S105 may include BSSI 1011 needed for the MS 100 to access via NIC-1 111 and BSSI 1053 needed for the MS 100 to access via NIC-2 113.

When the MS obtains BSSI 1011 and BSSI 1053 by receiving the probe response message S105, the MS 100 may try to access the AP by selecting a band preconfigured by a user or a band preferred by the MS 100, or by simultaneously using multiple NICs 111 and 113. This step may be referred to as the MS decision step S107. In addition, the probe response message S105 may include load/availability indicators in respective BSSIs, considering degrees of traffic congestion and load of the AP in respective frequency bands. The MS 100 may utilize the above information to determine which NIC the AP 200 uses to access the AP.

Then, an authentication step S209 for link configuration and an association step S211 for exchanging association information may be performed with NICs 211 and 213 of the AP 200. In the example embodiment of FIG. 10, it is illustrated as assumption that access is requested by simultaneously using both NIC-1 211 and NIC-2 213. In this case, the NIC-1 111 of the MS 100 performs the authentication step S109 and the association step S111 with the NIC-1 211 of the AP 200. Also, simultaneously or sequentially, the NIC-2 113 of the MS 100 performs the authentication step S109 and the association step S111 with the NIC-2 213 of the AP 200. When the above steps are completed successfully, the MS 100 may receive WLAN services by simultaneously utilizing both of NIC-1 111 and NIC-2 113.

Figure 11:
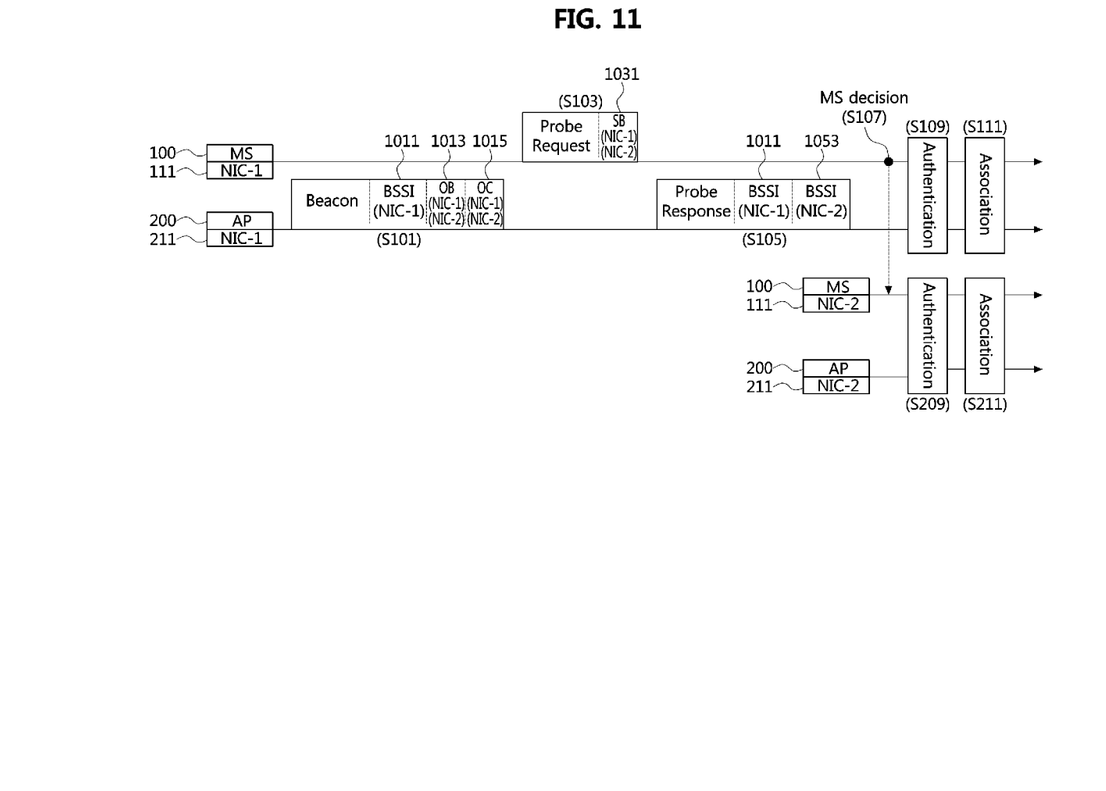
FIG. 11 illustrates the example embodiment of FIG. 10 in detail as representing details of messages.

FIG. 11 illustrates the example embodiment of FIG. 10 in detail as representing details of messages.

Figure 12:
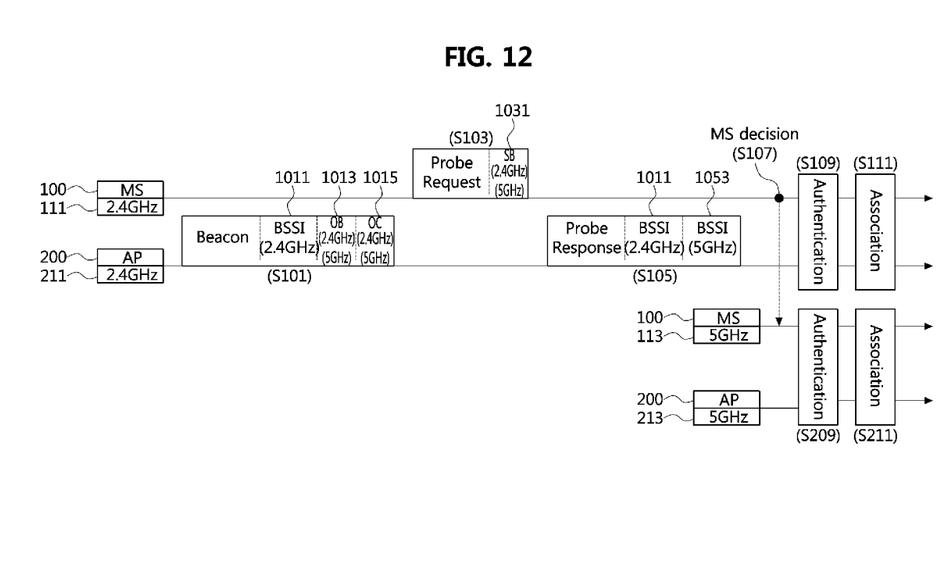
FIG. 12 illustrates operating example based on 2.4 GHz and 5 GHz bands for the example embodiment of FIG. 10.

FIG. 12 illustrates operating example based on 2.4 GHz and 5 GHz bands for the example embodiment of FIG. 10.

IEEE 802.11n WLAN may be used for multiple frequency bands, and it may typically operate in 2.4 GHz band and 5 GHz band. Meanwhile, although both a passive scanning and an active scanning can be used for 2.4 GHz band, only a passive scanning technique can be used for 5 GHz band according to frequency regulation. However, in case of the passive scanning in 5 GHz band, since a time is required for sequentially receiving beacon messages through multiple channels, it consumes long time for the MS to obtain AP access information.

Referring to FIG. 12 and considering the above restrictions, the present invention provides an effect that fast access in 5 GHz band becomes possible without performing passive scanning in 5 GHz band by using BSSI of 5 GHz band obtained through active scanning in 2.4 GHz band.

Referring to FIG. 12, the MS 100 tries to access WLAN. First, the AP 200 may periodically transmit individual beacon messages to MSs existing in service regions of all BSSs operated by it, in broadcast manner (S101). In this example embodiment, it is assumed that the AP 200 transmits a beacon in BSS-1 operated by 2.4 GHz NIC-1 211 (S101).

In this example embodiment, the MS 100 receives the beacon from 2.4 GHz NIC-1 111 as including BSSI 1011, OB information 1013, and OC information 1015. The BSSI 1011 includes access information of BSS-1. The OB information 1013 includes frequency band ID information of frequency bands operated by the AP 200 through 2.4 GHz NIC-1 211 and 5 GHz NIC-2 213. Also, the OC information 1015 includes detailed channel ID number information of frequency bands operated by the AP 200 through 2.4 GHz NIC-1 211 and 5 GHz NIC-2 213.

The MS 100 receiving the beacon may immediately try to access BSS-1 operated by 2.4 GHz NIC-1 211 of the AP 200 by using BSSI 1011. However, in case that the MS 100 tries to access BSS-2 operated by 5 GHz NIC-2 213 of the AP 200 other than BSS-1, it may be impossible to access it by using only information of the beacon S101. In this case, for requesting additional information, the MS 200 may transmit a probe request message to the AP 200 for requesting BSSI of 5 GHz NIC-2 213 in a broadcast manner (S103). (In addition, the MS which does not receive a beacon may transmit a probe request message in broadcast manner in order to request detailed BSSI to the AP.)

The probe request S103 may be transmitted as including supporting band (SB) information 1031 which comprises information on one or more frequency bands which can be accessed by one or more NICs 111 and 113 of the MS 100.

The AP 200 receiving the probe request message S103 may transmit a probe response message to the MS 100 in response to the probe request message, in unicast manner (S105). The probe response message may include BSSI 1011 needed for the MS 100 to access via 2.4 GHz NIC-1 111 and BSSI 1053 needed for the MS 100 to access via 5 GHz NIC-2 113, similarly to the beacon message S101.

When the MS obtains 2.4 GHz BSSI 1011 and 5 GHz BSSI 1053 by receiving the probe response message S105, the MS 100 may try to access the AP by selecting a band preconfigured by a user or a band preferred by the MS, or by simultaneously using multiple NICs 111 and 113. This step may be referred to as the MS decision step S107. In addition, the probe response message S105 may include load/availability indicators in respective BSSIs, considering degrees of traffic congestion and load of the AP in respective frequency bands. The MS 100 may utilize the above information to determine which NIC the AP 200 uses to access the AP.

Then, an authentication step S209 for link configuration and an association step S211 for exchanging association information may be performed with NICs 211 and 213 of the AP 200. In the example embodiment of FIG. 12, it is illustrated as assumption that access is requested by simultaneously using both 2.4 GHz NIC-1 211 and 5 GHz NIC-2 213. In this case, the 2.4 GHz NIC-1 111 of the MS 100 performs the authentication step S109 and the association step S111 with the 2.4 GHz NIC-1211 of the AP 200. Also, simultaneously or sequentially, the 5 GHz NIC-2 113 of the MS 100 performs the authentication step S109 and the association step S111 with the 5 GHz NIC-2 213 of the AP 200. When the above steps are completed successfully, the MS 100 may receive WLAN services by simultaneously utilizing both of 2.4 GHz NIC-1 111 and 5 GHz NIC-2 113.

Figure 13:
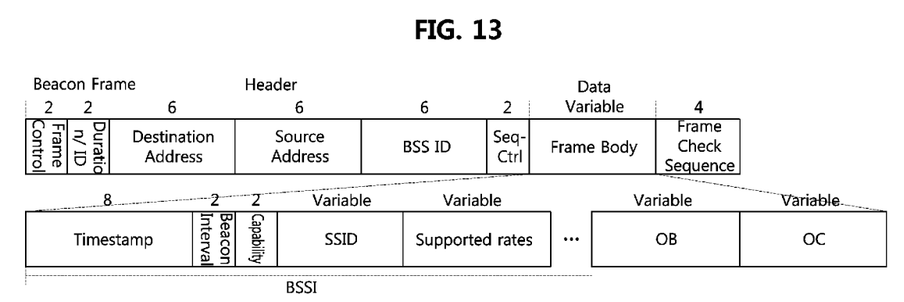
FIG. 13 illustrates a packet structure of a beacon message transmitted by AP according to the present invention.

FIG. 13 illustrates a packet structure of a beacon message transmitted by AP according to the present invention.

Figure 14:
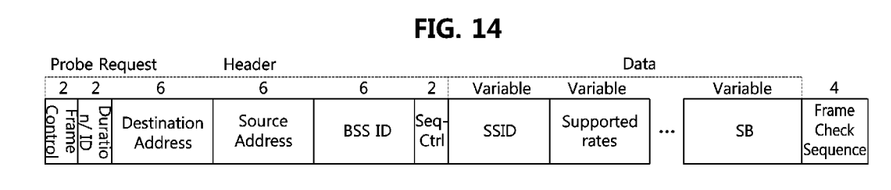
FIG. 14 illustrates a packet structure of a probe request message transmitted by MS according to the present invention.

FIG. 14 illustrates a packet structure of a probe request message transmitted by MS according to the present invention.

Figure 15:
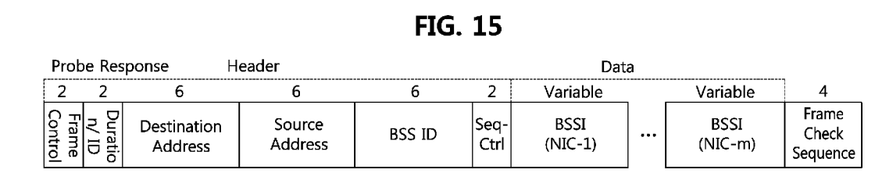
FIG. 15 illustrates a packet structure of a probe response message transmitted by AP according to the present invention.

FIG. 15 illustrates a packet structure of a probe response message transmitted by AP according to the present invention.

The invention claimed is:

1. A method of configuring a wireless link, performed in a mobile station, the method comprising:

receiving a beacon message, from a wireless access station supporting a plurality of communication channels, through a first communication channel among the plurality of communication channels;
obtaining first wireless access information, used for accessing the first communication channel, from the beacon message;
obtaining a list of one or more available communication channels, excluding the first communication channel, among the plurality of communication channels, from the beacon message;
determining a communication channel, for access, among the first communication channel and the one or more available communication channel;
transmitting, in response to the determined communication channel being one of the one or more available communication channels, a probe request message, requesting second wireless access information used for accessing the determined communication channel, to the wireless access station through the determined communication channel; and
receiving, in response to the probe request message, a probe response message comprising the second wireless access information, from the wireless access station, through the determined communication channel.

2. The method of claim 1, further comprising:
performing an authentication procedure with the wireless access station through the determined communication channel by using the second wireless access information; and
performing an association procedure with the wireless access station through the determined communication channel by using the second wireless access information.

3. A method of configuring a wireless link, performed in a wireless access station supporting a plurality of communication channels, the method comprising:
generating a beacon message comprising first wireless access information, used for accessing through a first communication channel among the plurality of communication channels, and a list of one or more available communication channels excluding the first communication channel among the plurality of communication channels;
transmitting the beacon message through the first communication channel;
receiving, from a mobile station, a probe request message, requesting second wireless access information used for accessing a second communication channel, through the second communication channel, wherein the second communication channel belongs to the list; and
transmitting, to the mobile station through the second communication channel, in response to the probe request message, a probe response message comprising the second wireless access information.

4. The method of claim 3, further comprising:
performing an authentication procedure with the mobile station through the second communication channel; and
performing an association procedure with the mobile station through the second communication channel.

5. A mobile station comprising:
a control processor configured to control operations of the mobile station; and
at least one network interface card configured to transmit and receive data based on commands of the control processor,
wherein the control processor is further configured to:
receive a beacon message, from a wireless access station supporting a plurality of communication channels, through a first communication channel among the plurality of communication channels,
obtain first wireless access information, used for accessing the first communication channel, from the beacon message,
obtain a list of one or more available communication channels, excluding the first communication channel among the plurality of communication channels, from the beacon message,
determine a communication channel, for access, among the first communication channel and the one or more available communication channels,
transmit, in response to the determined communication channel being one of the one or more available communication channels, a probe request message, requesting second wireless access information used for accessing the determined communication channel, to the wireless access station through the determined communication channel, and
receive, in response to the probe request message, a probe response message comprising the second wireless access information, from the wireless access station, through the determined communication channel.

6. The mobile station of claim 5, wherein the control processor further performs an authentication procedure with the wireless access station through the determined communication channel by using the second wireless access information, and performs an association procedure with the wireless access station through the determined communication channel by using the second wireless access information.

7. A wireless access station comprising:
a control processor configured to control operations of the wireless access station; and
at least one network interface card configured to transmit and receive data based on commands of the control processor,
wherein the control processor is further configured to:
generate a beacon message comprising first wireless access information, used for accessing through a first communication channel among the plurality of communication channels, and a list of one or more available communication channels excluding the first communication channel among the plurality of communication channels,
transmit the beacon message through the first communication channel,
receive, from a mobile station, a probe request message, requesting second wireless access information used for accessing a second communication channel, through the second communication channel, wherein the second communication channel belongs to the list, and
transmit, in response to the probe request message, a probe response message including the second wireless access information, to the mobile station, through the second communication channel.

8. The wireless access station of claim 7, wherein the control processor further performs an authentication procedure with the mobile station through the second communication channel, and performs an association procedure with the mobile station through the second communication channel.

* * * * *